US012075205B2

(12) United States Patent
Vitale et al.

(10) Patent No.: US 12,075,205 B2
(45) Date of Patent: Aug. 27, 2024

(54) MICROPHONE FUNCTIONALITY IN A MULTIPORT ARRAY

(71) Applicant: GoPro, Inc., San Mateo, CA (US)

(72) Inventors: Nicholas Vitale, Foster City, CA (US); Adrian Santos, Dublin, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 18/188,989

(22) Filed: Mar. 23, 2023

(65) Prior Publication Data

US 2023/0232143 A1 Jul. 20, 2023

Related U.S. Application Data

(63) Continuation of application No. 17/404,836, filed on Aug. 17, 2021, now Pat. No. 11,622,185.

(51) Int. Cl.

*H04R 1/04* (2006.01)
*H04R 1/28* (2006.01)
*H04R 19/04* (2006.01)

(52) U.S. Cl.

CPC ............. *H04R 1/04* (2013.01); *H04R 1/2807* (2013.01); *H04R 19/04* (2013.01); *H04R 2410/00* (2013.01)

(58) Field of Classification Search

CPC ........ H04R 1/04; H04R 1/2807; H04R 19/04; H04R 2410/00

See application file for complete search history.

(56) References Cited

U.S. PATENT DOCUMENTS

| | | | | |
|---|---|---|---|---|
| 10,021,800 | B1 * | 7/2018 | Zhang | H05K 5/0213 |
| 2015/0077910 | A1 * | 3/2015 | Xie | B23K 26/361 361/679.01 |
| 2018/0084340 | A1 * | 3/2018 | Clyne | H04R 1/44 |
| 2018/0103307 | A1 * | 4/2018 | Hansson | H04R 1/086 |
| 2020/0389725 | A1 | 12/2020 | Clyne | |
| 2023/0053374 | A1 | 2/2023 | Vitale | |

* cited by examiner

*Primary Examiner* — Mark Fischer
(74) *Attorney, Agent, or Firm* — Young Basile Hanlon & MacFarlane, P.C.

(57) ABSTRACT

An image capture device includes a housing having a pattern of apertures and a membrane assembly. The membrane assembly includes a support that has internal and external surfaces and a channel that aligns with at least one aperture of the pattern of apertures and extends between the internal and external surfaces. The membrane assembly includes indents that are adjacent to the channel, aligned with the pattern of apertures, and disposed on the external surface. The indents have a depth that is less than a depth of the channel.

20 Claims, 7 Drawing Sheets

MICROPHONE FUNCTIONALITY IN A MULTIPORT ARRAY

CROSS-REFERENCE TO RELATED APPLICATIONS

This application is a continuation of U.S. application Ser. No. 17/404,836, filed on Aug. 17, 2021, the entire disclosure of which is incorporated by reference.

TECHNICAL FIELD

This disclosure relates to a membrane assembly for use in an image capture device that improves the reception of sound at a microphone of the image capture device.

BACKGROUND

Typical cameras that include video capturing capabilities include components for inputting sounds from the external environment, such as microphones. Cameras with video capture capabilities are often used hiking, backpacking, surfing, skiing, sky diving, biking, canoeing, kayaking, sailing, boating, rock climbing, and/or horseback riding. Each of these activities are done outdoors and can have varying exposure to elements including lakes, oceans, rivers, rain, snow, wind, and the like, which requires extra precautions for cameras that are taking videos so that sound is adequately received and processed by the camera. In doing so, a camera includes multiple microphone ports that may have varying configurations. Sometimes these varying microphone ports lack aesthetic appeasement with consumers. Hence, what is needed art is a microphone port that meets aesthetic desirability of a traditional microphone design while retaining advantageous technology advancements in microphone ports to meet the vigor of outdoor activity.

SUMMARY

Disclosed herein are implementations of an image capture device including a housing that includes a pattern of apertures and a microphone disposed within the housing and proximate to the apertures. The image capture device includes a membrane assembly. The membrane assembly includes a support disposed between the housing and the microphone and a channel defined in the support that directs sound waves from only one of the apertures in the pattern to the microphone. The membrane assembly includes a membrane that extends across the channel and separates the one of the apertures and the microphone.

The support may include a first layer adjacent to the microphone and a second layer in direct contact with the housing and defining a pattern of indents that are aligned with a portion of the pattern of the apertures of the housing. The channel may include an external portion defined within the second layer and an internal portion defined within the first layer, and the membrane may separate the external and the internal portions of the channel. The first layer may include a foam material that is configured to provide pressure against an internal component of the housing so that the membrane does not shift during use of the image capture device. The indents may have a depth that is less than a depth of the channel so that the apertures overlaying the indents appear to be through channels to the microphone. The indents may have a depth that is less than a depth of the external portion of the channel. The second layer may include a backing layer in contact with the membrane and a patterned layer in direct contact with the housing. The patterned layer may define apertures that in combination with the backing layer form the pattern of indents of the second layer. The apertures of the patterned layer may have a depth that is less than a depth the external portion of the channel. The one of the apertures, the external portion of the channel, and the second layer in combination may form a cavity between the housing and the membrane that facilitates the movement of sound through the membrane to the microphone. The cavity may have a depth that is deeper than a depth of the indents. The diameter of the channel may be between about 2.5 mm and about 3.5 mm; the diameter of the apertures in the pattern may be between about 0.5 mm and about 1.5 mm; and the diameter of the channel may be uniform across a length of the channel.

The implementations taught herein provide a membrane assembly that includes a front layer in contact with an internal surface of a housing of an image capture device and defining an outer channel. The housing defines a pattern of apertures. The membrane assembly includes a back layer in contact with a microphone assembly disposed within the housing and defining an inner channel aligned with the outer channel. The back layer secures the membrane assembly against an internal component of the housing. The membrane assembly includes a membrane that separates the inner channel and the outer channel. The inner channel, the outer channel, and one of the apertures in the pattern are aligned so that sound is facilitated to the microphone through the one of the apertures aligned with the inner channel and the outer channel.

The membrane may be permeable to sound and prevent moisture from traveling between the inner channel and the outer channel. The front layer may include indents that are configured to align with the apertures and that do not facilitate movement of sound to the microphone. The indents may have a depth that is less than a depth of the outer channel so that the indents have an appearance of a through channel. The membrane may include a first sheet disposed within the outer channel that vibrates to transmit sound and a second sheet disposed within the inner channel that supports the first sheet as the first sheet trampolines sound. The first sheet and the second sheet may be free of contact.

The implementations taught herein provide an image capture device that includes a body including apertures and a microphone disposed within the body. The image capture device includes a membrane assembly separating the apertures and the microphone. The membrane assembly includes an inner layer adjacent to the microphone and an outer layer in contact with the body and defining indents that are aligned with most of the apertures of the body. The inner and the outer layers define a channel that extends between one of the apertures that is not aligned with one of the indents and the microphone. The membrane assembly includes a membrane that separates the inner layer and the outer layer and bisects the channel so that sound is movable along the channel and moisture is prevented from traveling between the one of the apertures and the microphone.

The channel may have a diameter that is larger than a diameter of the one of the apertures. Each of the indents may have a depth that is less than a depth of the channel defined within the outer layer. The apertures may be arranged in a pattern that overlays a pattern of the indents and the channel.

The implementations taught herein provide an image capture device that includes a housing having a pattern of apertures and a membrane assembly. The membrane assembly includes a support that has internal and external surfaces and a channel that aligns with at least one aperture of the pattern of apertures and extends between the internal and external surfaces. The membrane assembly includes indents that are adjacent to the channel, aligned with the pattern of apertures, and disposed on the external surface. The indents have a depth that is less than a depth of the channel.

The implementations taught herein provide a membrane assembly includes a support that has internal and external surface and a channel that extends across the internal and external surfaces. The membrane assembly includes a membrane intersecting the channel within the support and a pattern of indents disposed on the external surface adjacent to the channel.

The implementations taught herein provide an image capture device that includes a housing comprising indents and an aperture and a support integrated with the housing. The image capture device includes a microphone that is enclosed within the housing adjacent to the support and a channel that extends from the aperture through the support and to the microphone. The image capture device includes a membrane that intersects the channel.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

A membrane assembly for a microphone used with an image capture device includes indents positioned around a channel that facilitate sound travel. The indents are sufficiently deep to give the appearance of active through holes when positioned between a pattern of through holes on a housing of the image capture device and a microphone. The membrane assembly has an aesthetic of many active holes or apertures, while only one hole or aperture facilitates the travel of sound to a microphone. This is accomplished using indents within the membrane assembly that give the appearance of deeper holes through the body of an image capture device.

To achieve sound travel in this manner, the indents may have a depth that is less than the total depth of the active channel so that shadows or the like give the through holes of the image capture device the appearance of deeper holes that lead to a membrane and/or microphone. With this design, a user of the image capture device sees many microphone holes receiving sound, without the need to expose the membrane of the membrane assembly to unnecessary contact with outside elements or introduce addition noise paths. For example, the image capture device has improved water proofing by reducing the number of active channels that could be punctured from a foreign body, such as a stick or sand, while retaining desirable aesthetic properties. In addition, a predetermined membrane size can be used without reducing the number of through holes on the body of the image capture device.

An image capture device can improve sound reception by using multiple of the described membrane assemblies at multiple microphone ports, while reducing the number of active through holes that facilitate sound travel and giving the appearance of many through holes at each of the multiple microphone ports.

Figure 1A:
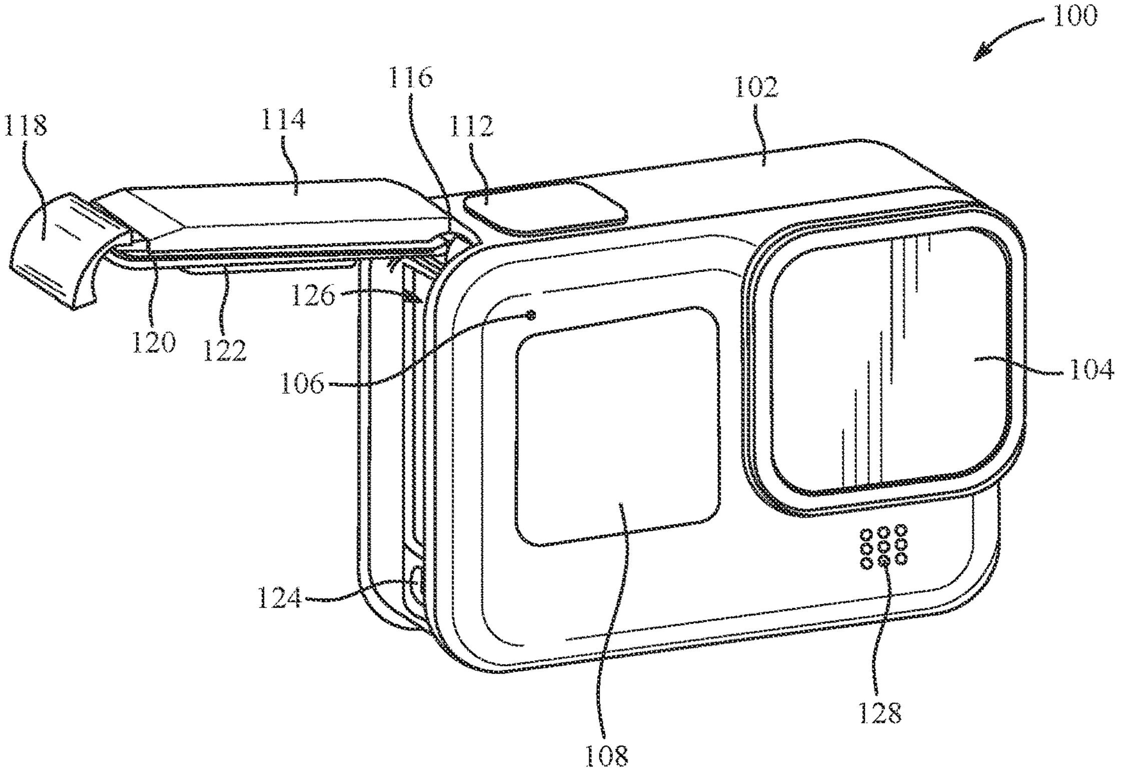
FIGS. 1A-1B are isometric views of an example of an image capture device.
Figure 1B:
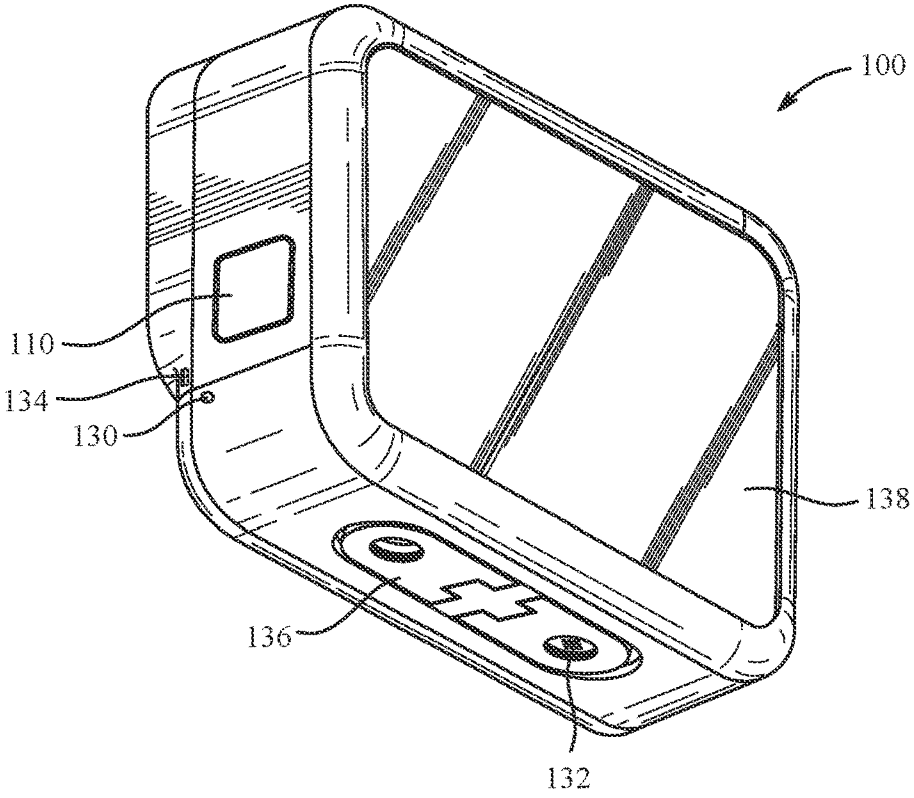

FIGS. 1A-B are isometric views of an example of an image capture device 100. The image capture device 100 may include a body 102, a lens 104 structured on a front surface of the body 102, various indicators on the front surface of the body 102 (such as light-emitting diodes (LEDs), displays, and the like), various input mechanisms (such as buttons, switches, and/or touch-screens), and electronics (such as imaging electronics, power electronics, etc.) internal to the body 102 for capturing images via the lens 104 and/or performing other functions. The lens 104 is configured to receive light incident upon the lens 104 and to direct received light onto an image sensor internal to the body 102. The image capture device 100 may be configured to capture images and video and to store captured images and video for subsequent display or playback.

The image capture device 100 may include an LED or another form of indicator 106 to indicate a status of the image capture device 100 and a liquid-crystal display (LCD) or other form of a display 108 to show status information such as battery life, camera mode, elapsed time, and the like. The image capture device 100 may also include a mode button 110 and a shutter button 112 that are configured to allow a user of the image capture device 100 to interact with the image capture device 100. For example, the mode button 110 and the shutter button 112 may be used to turn the image capture device 100 on and off, scroll through modes and settings, and select modes and change settings. The image capture device 100 may include additional buttons or interfaces (not shown) to support and/or control additional functionality.

The image capture device 100 may include a door 114 coupled to the body 102, for example, using a hinge mechanism 116. The door 114 may be secured to the body 102 using a latch mechanism 118 that releasably engages the body 102 at a position generally opposite the hinge mechanism 116. The door 114 may also include a seal 120 and a battery interface 122. When the door 114 is an open position, access is provided to an input-output (I/O) interface 124 for connecting to or communicating with external devices as described below and to a battery receptacle 126 for placement and replacement of a battery (not shown). The battery receptacle 126 includes operative connections (not shown) for power transfer between the battery and the image capture device 100. When the door 114 is in a closed position, the seal 120 engages a flange (not shown) or other interface to provide an environmental seal, and the battery interface 122 engages the battery to secure the battery in the battery receptacle 126. The door 114 can also have a removed position (not shown) where the entire door 114 is separated from the image capture device 100, that is, where both the hinge mechanism 116 and the latch mechanism 118 are decoupled from the body 102 to allow the door 114 to be removed from the image capture device 100.

The image capture device 100 may include a microphone 128 on a front surface and another microphone 130 on a side surface. The image capture device 100 may include other microphones on other surfaces (not shown). The microphones 128, 130 may be configured to receive and record audio signals in conjunction with recording video or separate from recording of video. The image capture device 100 may include a speaker 132 on a bottom surface of the image capture device 100. The image capture device 100 may include other speakers on other surfaces (not shown). The speaker 132 may be configured to play back recorded audio or emit sounds associated with notifications.

A front surface of the image capture device 100 may include a drainage channel 134. A bottom surface of the image capture device 100 may include an interconnect mechanism 136 for connecting the image capture device 100 to a handle grip or other securing device. In the example shown in FIG. 1B, the interconnect mechanism 136 includes folding protrusions configured to move between a nested or collapsed position as shown and an extended or open position (not shown) that facilitates coupling of the protrusions to mating protrusions of other devices such as handle grips, mounts, clips, or like devices.

The image capture device 100 may include an interactive display 138 that allows for interaction with the image capture device 100 while simultaneously displaying information on a surface of the image capture device 100.

The image capture device 100 of FIGS. 1A-B includes an exterior that encompasses and protects internal electronics. In the present example, the exterior includes six surfaces (i.e. a front face, a left face, a right face, a back face, a top face, and a bottom face) that form a rectangular cuboid. Furthermore, both the front and rear surfaces of the image capture device 100 are rectangular. In other embodiments, the exterior may have a different shape. The image capture device 100 may be made of a rigid material such as plastic, aluminum, steel, or fiberglass. The image capture device 100 may include features other than those described here. For example, the image capture device 100 may include additional buttons or different interface features, such as interchangeable lenses, cold shoes, and hot shoes that can add functional features to the image capture device 100.

The image capture device 100 may include various types of image sensors, such as charge-coupled device (CCD) sensors, active pixel sensors (APS), complementary metal—oxide—semiconductor (CMOS) sensors, N-type metal—oxide—semiconductor (NMOS) sensors, and/or any other image sensor or combination of image sensors.

Although not illustrated, in various embodiments, the image capture device 100 may include other additional electrical components (e.g., an image processor, camera system-on-chip (SoC), etc.), which may be included on one or more circuit boards within the body 102 of the image capture device 100.

The image capture device 100 may interface with or communicate with an external device, such as an external user interface device (not shown), via a wired or wireless computing communication link (e.g., the I/O interface 124). Any number of computing communication links may be used. The computing communication link may be a direct computing communication link or an indirect computing communication link, such as a link including another device or a network, such as the internet, may be used.

In some implementations, the computing communication link may be a Wi-Fi link, an infrared link, a Bluetooth (BT) link, a cellular link, a ZigBee link, a near field communications (NFC) link, such as an ISO/IEC 20643 protocol link, an Advanced Network Technology interoperability (ANT+) link, and/or any other wireless communications link or combination of links.

In some implementations, the computing communication link may be an HDMI link, a USB link, a digital video interface link, a display port interface link, such as a Video Electronics Standards Association (VESA) digital display interface link, an Ethernet link, a Thunderbolt link, and/or other wired computing communication link.

The image capture device 100 may transmit images, such as panoramic images, or portions thereof, to the external user interface device via the computing communication link, and the external user interface device may store, process, display, or a combination thereof the panoramic images.

The external user interface device may be a computing device, such as a smartphone, a tablet computer, a phablet, a smart watch, a portable computer, personal computing device, and/or another device or combination of devices configured to receive user input, communicate information with the image capture device 100 via the computing communication link, or receive user input and communicate information with the image capture device 100 via the computing communication link.

The external user interface device may display, or otherwise present, content, such as images or video, acquired by the image capture device 100. For example, a display of the external user interface device may be a viewport into the three-dimensional space represented by the panoramic images or video captured or created by the image capture device 100.

The external user interface device may communicate information, such as metadata, to the image capture device 100. For example, the external user interface device may send orientation information of the external user interface device with respect to a defined coordinate system to the image capture device 100, such that the image capture device 100 may determine an orientation of the external user interface device relative to the image capture device 100.

Based on the determined orientation, the image capture device 100 may identify a portion of the panoramic images or video captured by the image capture device 100 for the image capture device 100 to send to the external user interface device for presentation as the viewport. In some implementations, based on the determined orientation, the image capture device 100 may determine the location of the external user interface device and/or the dimensions for viewing of a portion of the panoramic images or video.

The external user interface device may implement or execute one or more applications to manage or control the image capture device 100. For example, the external user interface device may include an application for controlling camera configuration, video acquisition, video display, or any other configurable or controllable aspect of the image capture device 100.

The user interface device, such as via an application, may generate and share, such as via a cloud-based or social media service, one or more images, or short video clips, such as in response to user input. In some implementations, the external user interface device, such as via an application, may remotely control the image capture device 100 such as in response to user input.

The external user interface device, such as via an application, may display unprocessed or minimally processed images or video captured by the image capture device 100 contemporaneously with capturing the images or video by the image capture device 100, such as for shot framing or live preview, and which may be performed in response to user input. In some implementations, the external user interface device, such as via an application, may mark one or more key moments contemporaneously with capturing the images or video by the image capture device 100, such as with a tag or highlight in response to a user input or user gesture.

The external user interface device, such as via an application, may display or otherwise present marks or tags associated with images or video, such as in response to user input. For example, marks may be presented in a camera roll application for location review and/or playback of video highlights.

The external user interface device, such as via an application, may wirelessly control camera software, hardware, or both. For example, the external user interface device may include a web-based graphical interface accessible by a user for selecting a live or previously recorded video stream from the image capture device 100 for display on the external user interface device.

The external user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

Figure 2A:
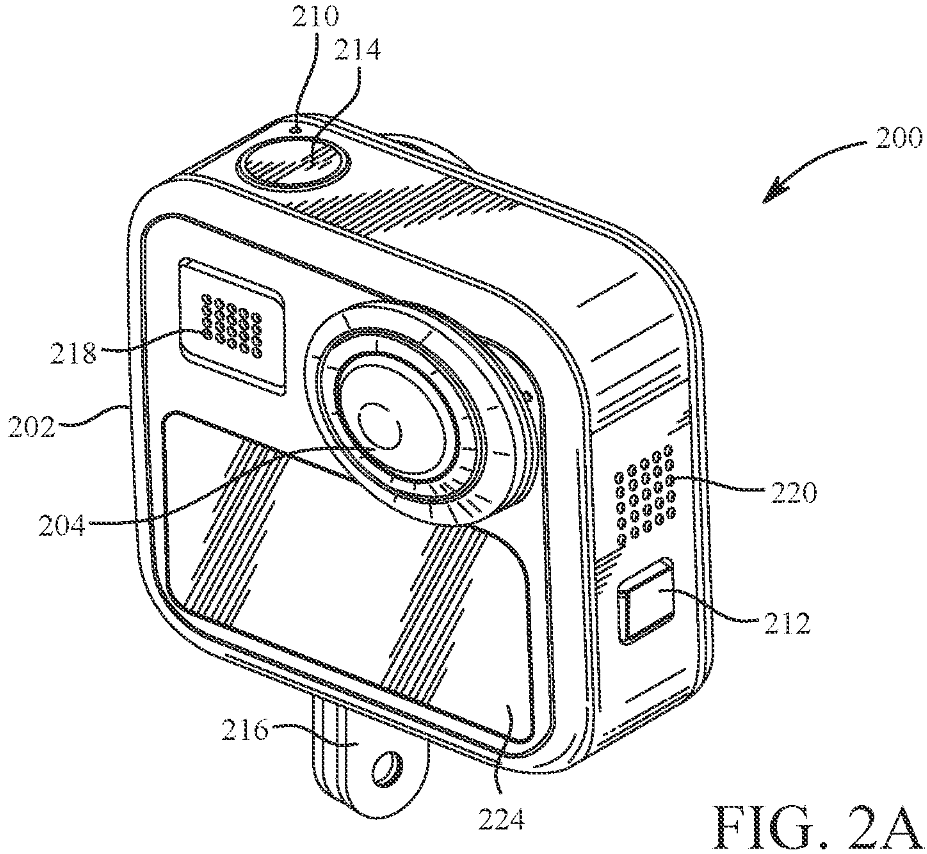
FIGS. 2A-2B are isometric views of another example of an image capture device.
Figure 2B:
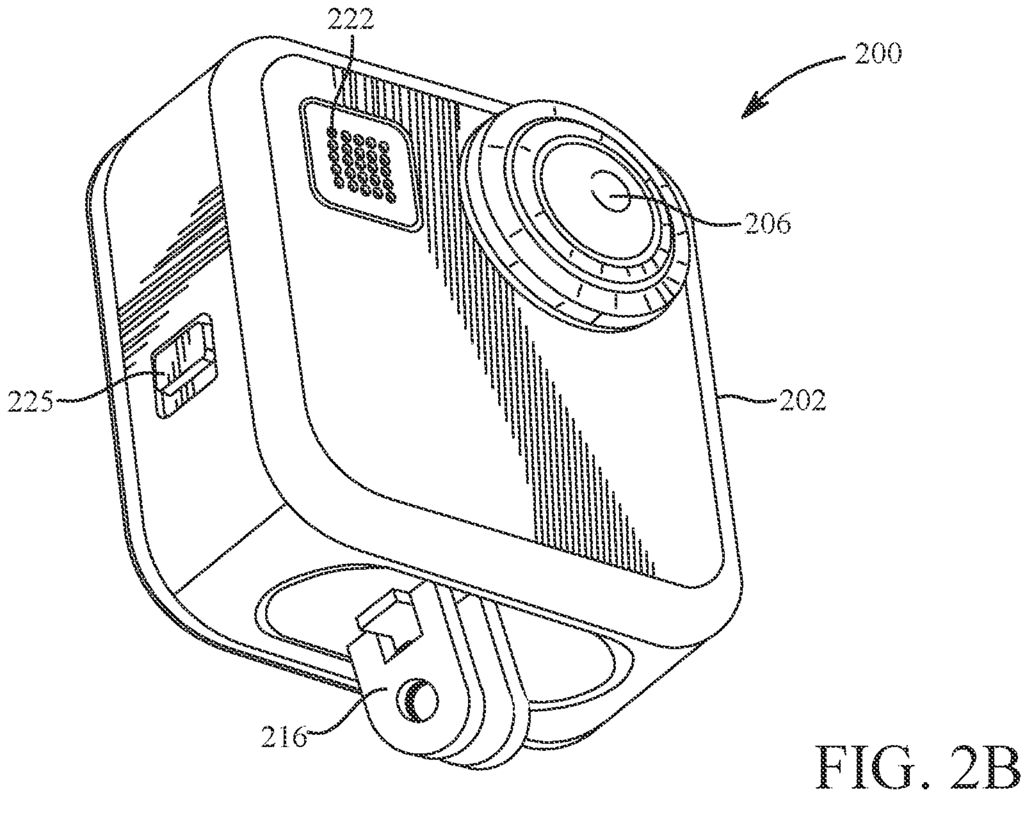

FIGS. 2A-B illustrate another example of an image capture device 200. The image capture device 200 includes a body 202 and two camera lenses 204 and 206 disposed on opposing surfaces of the body 202, for example, in a back-to-back configuration, Janus configuration, or offset Janus configuration. The body 202 of the image capture device 200 may be made of a rigid material such as plastic, aluminum, steel, or fiberglass.

The image capture device 200 includes various indicators on the front of the surface of the body 202 (such as LEDs, displays, and the like), various input mechanisms (such as buttons, switches, and touch-screen mechanisms), and electronics (e.g., imaging electronics, power electronics, etc.) internal to the body 202 that are configured to support image capture via the two camera lenses 204 and 206 and/or perform other imaging functions.

The image capture device 200 includes various indicators, for example, LEDs 208, 210 to indicate a status of the image capture device 100. The image capture device 200 may include a mode button 212 and a shutter button 214 configured to allow a user of the image capture device 200 to interact with the image capture device 200, to turn the image capture device 200 on, and to otherwise configure the operating mode of the image capture device 200. It should be appreciated, however, that, in alternate embodiments, the image capture device 200 may include additional buttons or inputs to support and/or control additional functionality.

The image capture device 200 may include an interconnect mechanism 216 for connecting the image capture device 200 to a handle grip or other securing device. In the example shown in FIGS. 2A and 2B, the interconnect mechanism 216 includes folding protrusions configured to move between a nested or collapsed position (not shown) and an extended or open position as shown that facilitates coupling of the protrusions to mating protrusions of other devices such as handle grips, mounts, clips, or like devices.

The image capture device 200 may include audio components 218, 220, 222 such as microphones configured to receive and record audio signals (e.g., voice or other audio commands) in conjunction with recording video. The audio component 218, 220, 222 can also be configured to play back audio signals or provide notifications or alerts, for example, using speakers. Placement of the audio components 218, 220, 222 may be on one or more of several surfaces of the image capture device 200. In the example of FIGS. 2A and 2B, the image capture device 200 includes three audio components 218, 220, 222, with the audio component 218 on a front surface, the audio component 220 on a side surface, and the audio component 222 on a back surface of the image capture device 200. Other numbers and configurations for the audio components are also possible.

The image capture device 200 may include an interactive display 224 that allows for interaction with the image capture device 200 while simultaneously displaying information on a surface of the image capture device 200. The interactive display 224 may include an I/O interface, receive touch inputs, display image information during video capture, and/or provide status information to a user. The status information provided by the interactive display 224 may include battery power level, memory card capacity, time elapsed for a recorded video, etc.

The image capture device 200 may include a release mechanism 225 that receives a user input to in order to change a position of a door (not shown) of the image capture device 200. The release mechanism 225 may be used to open the door (not shown) in order to access a battery, a battery receptacle, an I/O interface, a memory card interface, etc. (not shown) that are similar to components described in respect to the image capture device 100 of FIGS. 1A and 1B.

In some embodiments, the image capture device 200 described herein includes features other than those described. For example, instead of the I/O interface and the interactive display 224, the image capture device 200 may include additional interfaces or different interface features. For example, the image capture device 200 may include additional buttons or different interface features, such as interchangeable lenses, cold shoes, and hot shoes that can add functional features to the image capture device 200.

Figure 3:
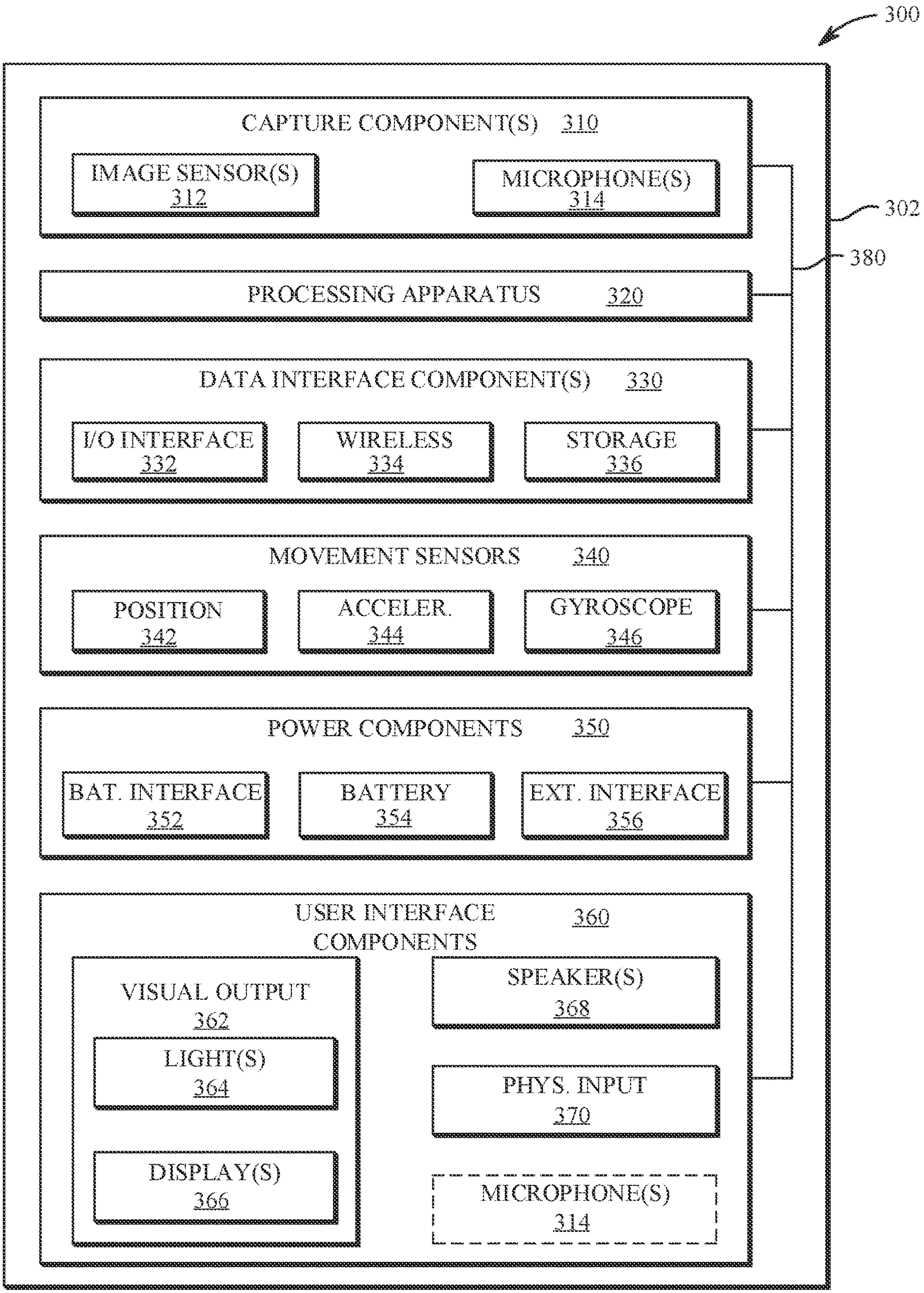
FIG. 3 is a block diagram of electronic components of an image capture device.

FIG. 3 is a block diagram of electronic components in an image capture device 300. The image capture device 300 may be a single-lens image capture device, a multi-lens image capture device, or variations thereof, including an image capture device with multiple capabilities such as use of interchangeable integrated sensor lens assemblies. The description of the image capture device 300 is also applicable to the image capture devices 100, 200 of FIGS. 1A-B and 2A-D.

The image capture device 300 includes a body 302 which includes electronic components such as capture components 310, a processing apparatus 320, data interface components 330, movement sensors 340, power components 350, and/or user interface components 360.

The capture components 310 include one or more image sensors 312 for capturing images and one or more microphones 314 for capturing audio.

The image sensor(s) 312 is configured to detect light of a certain spectrum (e.g., the visible spectrum or the infrared spectrum) and convey information constituting an image as electrical signals (e.g., analog or digital signals). The image sensor(s) 312 detects light incident through a lens coupled or connected to the body 302. The image sensor(s) 312 may be any suitable type of image sensor, such as a charge-coupled device (CCD) sensor, active pixel sensor (APS), complementary metal—oxide—semiconductor (CMOS) sensor, N-type metal—oxide—semiconductor (NMOS) sensor, and/or any other image sensor or combination of image sensors. Image signals from the image sensor(s) 312 may be passed to other electronic components of the image capture device 300 via a bus 380, such as to the processing apparatus 320. In some implementations, the image sensor(s) 312 includes a digital-to-analog converter. A multi-lens variation of the image capture device 300 can include multiple image sensors 312.

The microphone(s) 314 is configured to detect sound, which may be recorded in conjunction with capturing images to form a video. The microphone(s) 314 may also detect sound in order to receive audible commands to control the image capture device 300.

The processing apparatus 320 may be configured to perform image signal processing (e.g., filtering, tone mapping, stitching, and/or encoding) to generate output images based on image data from the image sensor(s) 312. The processing apparatus 320 may include one or more processors having single or multiple processing cores. In some implementations, the processing apparatus 320 may include an application specific integrated circuit (ASIC). For example, the processing apparatus 320 may include a custom image signal processor. The processing apparatus 320 may exchange data (e.g., image data) with other components of the image capture device 300, such as the image sensor(s) 312, via the bus 380.

The processing apparatus 320 may include memory, such as a random-access memory (RAM) device, flash memory, or another suitable type of storage device, such as a non-transitory computer-readable memory. The memory of the processing apparatus 320 may include executable instructions and data that can be accessed by one or more processors of the processing apparatus 320. For example, the processing apparatus 320 may include one or more dynamic random-access memory (DRAM) modules, such as double data rate synchronous dynamic random-access memory (DDR SDRAM). In some implementations, the processing apparatus 320 may include a digital signal processor (DSP). More than one processing apparatus may also be present or associated with the image capture device 300.

The data interface components 330 enable communication between the image capture device 300 and other electronic devices, such as a remote control, a smartphone, a tablet computer, a laptop computer, a desktop computer, or a storage device. For example, the data interface components 330 may be used to receive commands to operate the image capture device 300, transfer image data to other electronic devices, and/or transfer other signals or information to and from the image capture device 300. The data interface components 330 may be configured for wired and/or wireless communication. For example, the data interface components 330 may include an I/O interface 332 that provides wired communication for the image capture device, which may be a USB interface (e.g., USB type-C), a high-definition multimedia interface (HDMI), or a FireWire interface. The data interface components 330 may include a wireless data interface 334 that provides wireless communication for the image capture device 300, such as a Bluetooth interface, a ZigBee interface, and/or a Wi-Fi interface. The data interface components 330 may include a storage interface 336, such as a memory card slot configured to receive and operatively couple to a storage device (e.g., a memory card) for data transfer with the image capture device 300 (e.g., for storing captured images and/or recorded audio and video).

The movement sensors 340 may detect the position and movement of the image capture device 300. The movement sensors 340 may include a position sensor 342, an accelerometer 344, or a gyroscope 346. The position sensor 342, such as a global positioning system (GPS) sensor, is used to determine a position of the image capture device 300. The accelerometer 344, such as a three-axis accelerometer, measures linear motion (e.g., linear acceleration) of the image capture device 300. The gyroscope 346, such as a three-axis gyroscope, measures rotational motion (e.g., rate of rotation) of the image capture device 300. Other types of movement sensors 340 may also be present or associated with the image capture device 300.

The power components 350 may receive, store, and/or provide power for operating the image capture device 300. The power components 350 may include a battery interface 352 and a battery 354. The battery interface 352 operatively couples to the battery 354, for example, with conductive contacts to transfer power from the battery 354 to the other electronic components of the image capture device 300. The power components 350 may also include an external interface 356, and the power components 350 may, via the external interface 356, receive power from an external source, such as a wall plug or external battery, for operating the image capture device 300 and/or charging the battery 354 of the image capture device 300. In some implementations, the external interface 356 may be the I/O interface 332. In such an implementation, the I/O interface 332 may enable the power components 350 to receive power from an external source over a wired data interface component (e.g., a USB type-C cable).

The user interface components 360 may allow the user to interact with the image capture device 300, for example, providing outputs to the user and receiving inputs from the user. The user interface components 360 may include visual output components 362 to visually communicate information and/or present captured images to the user. The visual output components 362 may include one or more lights 364 and/or more displays 366. The display(s) 366 may be configured as a touch screen that receives inputs from the user. The user interface components 360 may also include one or more speakers 368. The speaker(s) 368 can function as an audio output component that audibly communicates information and/or presents recorded audio to the user. The user interface components 360 may also include one or more physical input interfaces 370 that are physically manipulated by the user to provide input to the image capture device 300. The physical input interfaces 370 may, for example, be configured as buttons, toggles, or switches. The user interface components 360 may also be considered to include the microphone(s) 314, as indicated in dotted line, and the microphone(s) 314 may function to receive audio inputs from the user, such as voice commands. The image capture device 300 may include one or more ISLAs that assist in taking and recording images and/or videos.

Figure 4A:
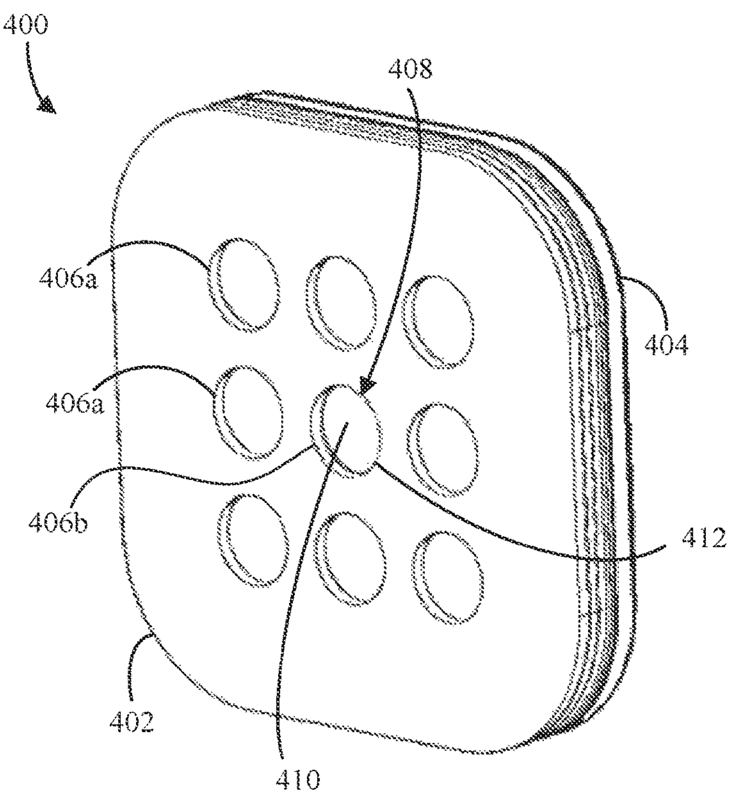
FIG. 4A is a perspective view of a membrane assembly showing a front layer.
Figure 4B:
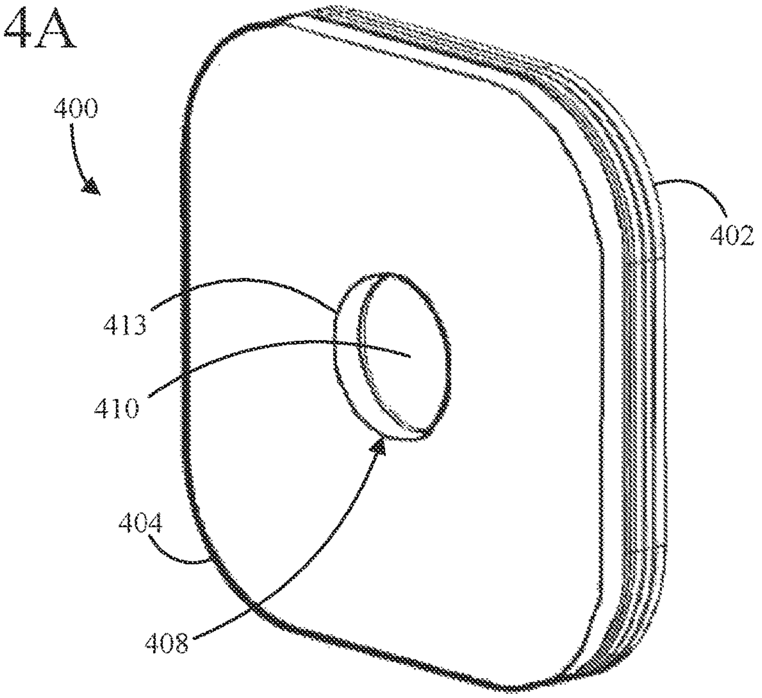
FIG. 4B is a perspective view of the membrane assembly of FIG. 4A showing the back layer.

FIG. 4A is a perspective view of a membrane assembly 400 showing a front layer 402. FIG. 4B is a perspective view of the membrane assembly 400 of FIG. 4A showing a back layer 404. The membrane assembly 400 may be affixed to an inside surface of a body (i.e., a housing of an image capture device) at a location of a microphone, such as at the bodies 102, 202 and the microphone 128 or audio components 218, 220, 222 of FIGS. 1A-2B.

The back layer 404 is affixed to the front layer 402 so that the membrane assembly 400 forms a multi-layer arrangement. The front and back layers 402, 404 may be affixed by any known method, such as adhesive or fasteners. On the front layer 402, apertures **406*a* are defined that extend from the front layer 402 to a backstop at an inner layer (e.g., structural layer 418 of FIG. 4D) of the front layer 402 or at the back layer 404 so that the apertures 406*a* appear as through holes from an outside perspective of an image capture device, such as the image capture devices 100, 200 of FIGS. 1A-2B. When the inner layer of the front layer 402 or the back layer 404 forms a back stop for the apertures 406*a*, the apertures 406*a* may be described as indents within the context of the membrane assembly 400** as a whole.

At approximately a center of the front and back layers 402, 404, another aperture **406*b* defines one end of a channel 408 that runs through the front and back layers 402, 404, and at the contact point of the front and back layers 402, 404, the channel 408 is bisected by a membrane 410. Compared to the apertures 406*a*, the aperture 406*b* may be described as an aperture 406*b* that is active because sound can traverse the membrane 410 through the aperture 406*b*, whereas the apertures 406*a* do not permit sound to traverse the membrane 410 because the sound is stopped by the inner layer of the front layer 402 or the back layer 404 that acts as a backstop to the apertures 406*a***.

The apertures **406*a*, 406*b* may have a diameter sufficient to appear as active through holes for facilitating the transmission of sound. In other instances, the apertures 406*a*, 406*b* may have a diameter that does not inhibit transmission of sound and prevents entry of excessive debris or dirt to the channel 408. For example, the apertures 406*a*, 406*b* may have a diameter of about 1 mm to about 1.75 mm. In other examples, the diameter of the apertures 406*a*, 406*b* may be related to the diameter of the channel 408 so that the channel 408 can house the membrane 410 sized to provide exceptional facilitation of sound while prohibiting debris or dirt from clogging the channel 408**.

The membrane 410 may function to prevent the flow of water and/or moisture between outer (i.e., defined within the front layer 402) and inner (i.e., defined within the back layer 404) portions 412, 413 of the channel 408 and to allow sound to permeate between the outer and inner portions 412, 413 of the channel 408. The membrane 410 may be sandwiched between the front and back layers 402, 404 by any known technique, such as adhesive or compressive forces stemming from the arrangement of the membrane assembly 400 within a body of an image camera device, such as the bodies 102, 202 and image capture devices 100, 200 of FIGS. 1A-2B.

The membrane 410 may be composed of any material sufficient to allow sound to traverse the membrane 410 and prevent water and/or moisture from permeating through the membrane 410. The membrane 410 may be composed of one or more of polytetrafluoroethylene, polyvinylidene fluoride, or a combination of both. The membrane 410 may be sized and configured so that when the membrane 410 is cold, such as in snowy or icy conditions, the membrane 410 does not have undesirable vibration patterns when receiving a sound wave from the external environment. In some examples, the membrane 410 may have a size that is the same as the front and back layers 402, 404 so that the membrane 410 and the front and back layers 402, 404 can be easily aligned during production of the membrane assembly 400. In other examples, the membrane 410 may have a size that is generally smaller than the front and back layers 402, 404, such as about one millimeter larger than a diameter of the channel 408.

The outer and inner portions 412, 413 may function to define the two parts or pathways of the channel 408 between a microphone (e.g., microphone 510 of FIG. 5) and the exterior environment. The outer and inner portions 412, 413 may have diameters that are the same or, in combination, may have a diameter that is tapered so that sound traveling through the channel 408 is desirably directed to the microphone (not shown). For example, the outer portion 412 may have a diameter that is largest at an outer edge of the front layer 402 and may taper down to a diameter that is smaller at an edge of the front layer 402 that contacts or is nearest to the back layer 404. In this example, the inner portion 413 may have a diameter that matches the diameter of the outer portion 412 at edges of the front and back layers 402, 404, and the diameter of the inner portion 413 may taper down to a lowest diameter at an opposite edge of the back layer 404. In other examples, the inner portion 413 may have a diameter that is generally larger and tapers down to a diameter that is smaller at the outer portion 412. In any of these examples, the outer and inner portions 412, 413 may have any diameter sufficient to secure or support the membrane 410 within the channel 408 so that water cannot pass through the outer portion 412 to the inner portion 413. For example, the outer and inner portions 412, 413 may have a diameter of about 1.5 mm to about 3.5 mm.

Figure 5:
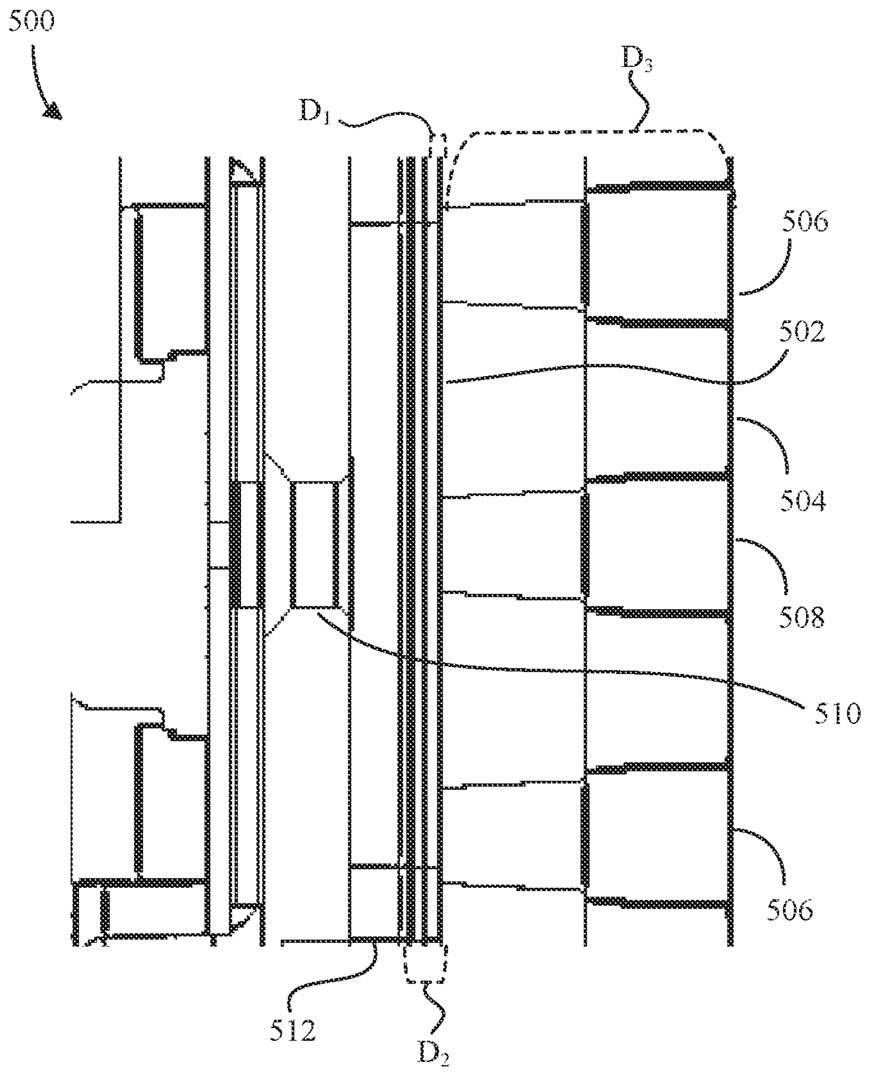
FIG. 5 is a cross-sectional view of an image capture device showing a membrane assembly within a housing.

Regarding depth, the outer and inner portions 412, 413 may each have a depth that is generally the same so that the same distance separates the membrane 410 and the external environment and the membrane 410 and a microphone (e.g., microphone 510 of FIG. 5). In other examples, the outer and inner portions 412, 413 have depths that are different to vary the distances that sound travels before contacting the membrane 410 and/or the microphone. The outer and inner portions 412, 413 may have any depth individually or together that facilitates clear traversal of sound to the membrane and/or the microphone. For example, the outer and inner portions 412, 413 may each have a depth of about 0.5 mm to about 1.5 mm.

Figure 4C:
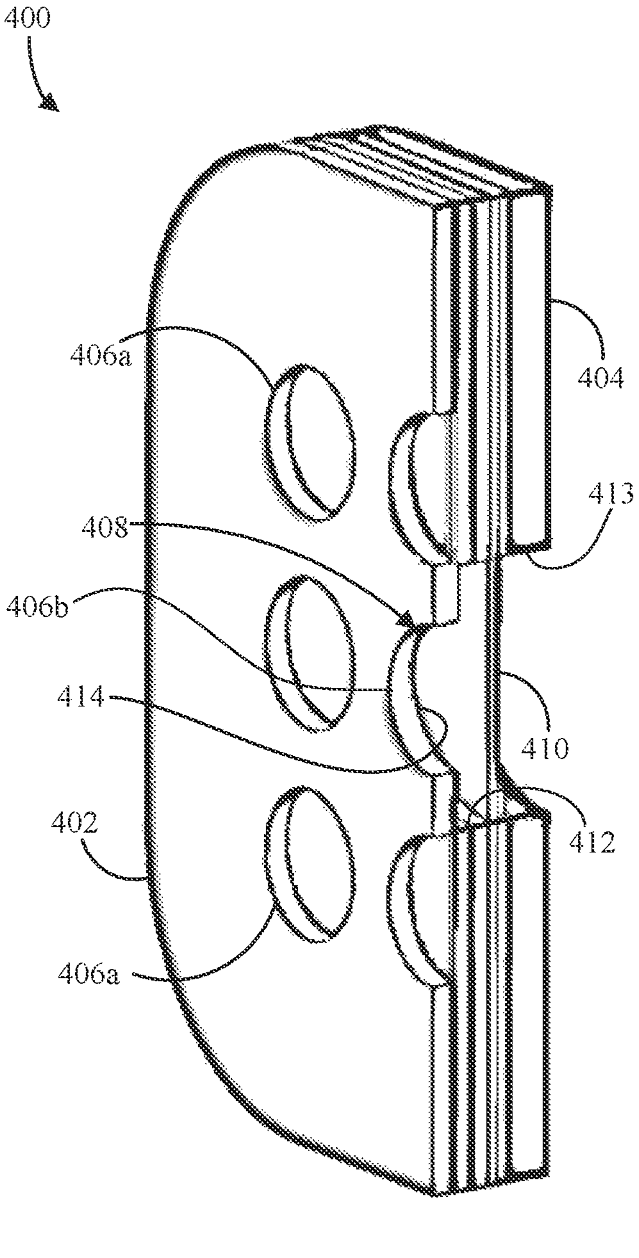
FIG. 4C is a cross-sectional view of the membrane assembly of FIGS. 4A and 4B through a center of the channel.

FIG. 4C is a cross-sectional view of the membrane assembly 400 of FIGS. 4A and 4B through a center of the channel 408. A cavity 414 is defined within the outer portion 412 of the channel 408 between the aperture **406*b* and the membrane 410. The cavity 414 functions to separate the membrane 410 from the exterior environment so that contact by sharp objects, like sticks and sand, do not extend through a body of an image capture device and pierce the membrane 410, which would undesirably allow water to reach the microphone through the inner portion 413. As shown, the outer and inner portions 412, 413 have diameters that are the same, and hence, the channel 408 has a uniform diameter. In this example, the apertures 406*a*, 406*b* have a diameter that is smaller than the diameter of the channel 408 and the outer and inner portions 412, 413 so that the aperture 406*b* mitigates the amount of dirt and debris that can reach the membrane 410 due to the smaller diameter of the aperture 406*b*. In other examples, the diameter of the channel 408 and the aperture 406*b* may be the same so that the traversal of sound through the membrane 410** is adjustable.

At the front layer 402, the apertures **406*a* extend through some layers of the front layer 402 and do not extend fully to the back layer 404 and/or the membrane 410. In this example, the apertures 406*a* may have a depth that is less than a depth of the outer portion 412 of the channel 408 or cavity 414 that extends between the membrane 410 and the exterior layer(s) of the front layer 402. In other examples, the apertures 406*a* extend fully through all of the layers of the front layer 402 so that the membrane 410 or the back layer 404 are visible from a front view of the membrane assembly 400. Whether the apertures 406*a* extend partially through some of the layers or fully through all of the layers of the front layer 402, the apertures 406***a* appear as indents from the front view of the membrane assembly 400. Further, when combined with a body of an image capture device, such as the bodies 102, 202 of the image capture devices 100, 200 of FIGS. 1A-2B, the apertures 406*a* appear to be fully active through holes that facilitate the traversal of sound between an internal microphone (e.g., microphone 510 FIG. 5) and the external environment, even though sound is actually transmitted only through the aperture 406*b*. The apertures 406*a* may have any depth sufficient to give the appearance of active through holes that facilitate transmission of sound. For example, the apertures 406*a* may have a depth of about 0.25 mm to about 1 mm.

Figure 4D:
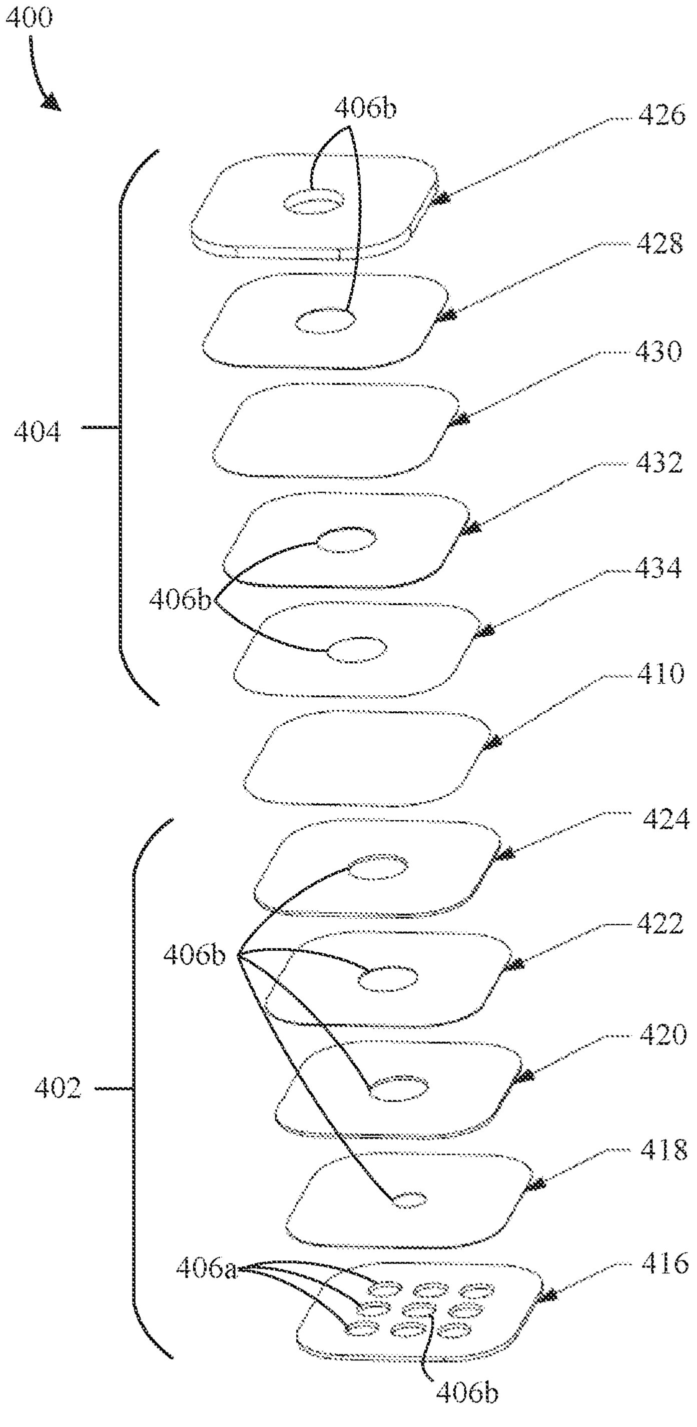
FIG. 4D is an exploded view of the membrane assembly of FIG. 4A.

FIG. 4D is an exploded view of the membrane assembly 400 of FIG. 4A. The front and back layers 402, 404 are divided into multiple sub-layers that are designed to improve one or more properties of the front and/or back layers 402, 404 or the overall structure of the membrane assembly 400. For example, one or more of these sub-layers may improve adhesion between other layers, provide structural support to one or more other components of the membrane assembly 400, or provide water sealing properties at the contact point with a body of an image capture device, such as the bodies 102, 202 of the image capture devices 100, 200 of FIGS. 1A-2B.

The front and back layers 402, 404 may have generally the same width so that the sub-layers (each of the sub-layers are described in detail below) can align easily. The sub-layers of the front and back layers 402, 404 are stacked in a generally uniform fashion so that edges of each sub-layer are aligned with each other. In other examples, some of the sub-layers may be wider and/or narrower so that the edges are not generally aligned with each other (i.e., some of the sub-layers overhang on other sub-layers). Whether aligned or not, the front and back layers 402, 404 may have any width sufficient to cover or obstruct one or more openings on a body of an image capture device, such as the bodies 102, 202 of the image capture devices 100, 200 of FIGS. 1A-2B, so that the image capture device is waterproof at a location of the membrane assembly 400. For example, the front and back layers 402, 404 may each have a width or a length of about 7.5 mm to about 12.5 mm.

The front layer 402 functions to form the exterior layer between the membrane 410 and the body of the image capture device that gives the appearance of a multi-hole microphone with exceptional sound facilitation features. The front layer 402 includes an adhesive layer 416 that is configured to affix to the body and a structural layer 418. The structural layer 418 is bound by another adhesive layer 420 to another structural layer 422, which is bound to the back layer 404 and/or the membrane 410 at another adhesive layer 424, so that the front layer 402 has sufficient structural support for binding to the body and supporting the membrane 410. In this example, the front layer 402 shows five distinct layers 416, 418, 420, 422, 424. In other examples, the front layer 402 may include more or less layers to vary the structural properties of the front layer 402.

The adhesive layer 416 functions to connect the membrane assembly 400 with the body of the image capture device and to give the appearance of active through holes that facilitate traversal of sound through the body of the image capture device. The adhesive layer 416 includes eight apertures 406*a*, three of which are indicated in FIG. 4D, that are inactive (i.e., do not facilitate transmission of sound to the membrane 410 and/or microphone (e.g., microphone 128, 510 of FIGS. 1A and 5). In other examples, the adhesive layer 416 can include more or less than eight apertures that are inactive, such as four, twelve, or sixteen apertures 406*a*.

The adhesive layer 416 includes only one aperture 406*b* that facilitates traversal of sound to the membrane 410 and/or the microphone. Generally, the apertures 406*a*, 406*b* are arranged in a pattern that provides the appearance of many through holes working in conjunction to optimize transmission of sound to the membrane 410 and/or the microphone. The pattern may include any number of apertures 406*a*, 406*b* that form a shape of a square, rectangle, oval, circle, trapezoid, triangle, pentagon, hexagon, heptagon, octagon, or any combination of shapes that form a shape not here described.

The adhesive layer may 416 have a thickness that defines the depth of the apertures 406*a* and, hence, may have a thickness that defines the entire depth of an indent, when the apertures 406*a* are described in combination with the structural layer 418 or some other layer. For example, the adhesive layer 416 may have a thickness of about 0.005 mm to about 0.5 mm. The adhesive layer 416 may be composed of any combination of components that provide adhesion properties between a layer contacting a front side of the adhesive layer 416 and a layer contacting a back side of the adhesive layer 416. For example, the adhesive layer 416 may be composed of one or more of polyurethane, epoxy, polyimide, acrylic, silicone, or any combination thereof.

The adhesive layers 420, 424 may function to each connect two or more layers without letting two or more layers contact. The adhesive layers 420, 424 may be composed of similar or different components as the adhesive layer 416. For example, the adhesive layers 420, 424 may be composed of one or more of polyurethane, epoxy, polyimide, or any combination thereof. The adhesive layers 420, 424 include only one aperture 406*b* that facilitates the traversal of sound to the membrane 410 and/or the microphone. Each of the adhesive layers 420, 424 may have the same or different thicknesses to vary the depth of the channel 408 (FIGS. 4A-4C). For example, independently, the adhesive layers 420, 424 may have a thickness of about 0.005 mm to about 0.5 mm.

The structural layers 418, 422 may function to provide structural support for the front layer 402 and additional thickness for the channel 408 (FIGS. 4A-4C). The structural layers 418, 422 may be composed of any component configured to improve stiffness of the front layer 402. For example, the structural layers 418, 422 may be composed of one or more of polyethylene terephthalate, derivatives of polyethylene terephthalate, metal, another plastic sufficient to give structural support, or a combination thereof. The structural layers 418, 422 may have a thickness sufficient to provide the outer portion 412 (FIG. 4C) with a deeper depth relative to the thickness of the adhesive layer 416. For example, the structural layers 418, 422 may have a thickness of about 0.01 mm to about 0.1 mm. The structural layers 418, 422 include only one aperture 406*b* each that facilitates the transmission of sound to the membrane 410 and/or the microphone. The apertures 406*b* of the structural layers 418, 422 may have diameters that are the same or different. As shown, the structural layer 418 has an aperture 406*b* that matches the diameter of the aperture 406*b* of the adhesive layer 416, and the aperture 406*b* of the structural layer 422 may have a diameter that matches diameters of the apertures 406*b* of the adhesive layers 420, 424 so that the apertures 406*b* provide a clear pathway for facilitation of sound. In other words, the apertures 406*b* in the layers 420, 422, 424 are larger than the apertures 406*b* in the layers 416, 418 in the example of FIG. 4D.

The back layer 404 functions to provide a compressible material that provides pressure against one or more internal components of the image capture device in which the membrane assembly 400 is installed so that waterproof properties of the membrane assembly 400 are improved. The back layer 404 includes a compressible layer 426 contacting an adhesive layer 428 so that the compressible layer 426 does not shift relative to other layers of the back layer 404. The adhesive layer 428 connects a sub-membrane 430 with the compressible layer 426, and the back layer 404 includes two adhesive layers 432, 434 connecting the membrane 410 to the sub-membrane 430 so as to form a complete structure of the back layer 404 supporting the membrane 410 and the front layer 402.

The compressible layer 426 may function to apply pressure against one or more internal components of the image capture device so that water or moisture is prevented from traveling around edges of the front layer 402 that contact the body of the image capture device. The compressible layer 426 may have any thickness sufficient to provide adequate compressive force to create a sufficient watertight seal between the edges of the front layer 402 and the body. For example, the compressible layer 426 may have a thickness of about 0.1 mm to about 1 mm. The compressible layer 426 may be composed of a material that has compressible properties, such as a foam. If a foam is used, the compressible layer 426 may be an open or closed cell foam. The compressible layer 426 may be composed of one or more of a polyurethane foam, polyethylene foam, melamine foam, foamed rubber, ethylene vinyl acetate foam, or any combination thereof.

The adhesive layers 428, 432, 434 may function to structurally secure the membrane assembly 400 together. The adhesive layers 428, 432, 434 may be composed of a material that is described in relation to the adhesive layers 416, 420, 424 so that adequate adhesion properties are present in each of the adhesive layers 428, 432, 434. The adhesive layers 428, 432, 434 may have the same or similar dimensions (i.e., length and/or width) relative to the adhesive layers 416, 420, 424 so that the desired overall length and width of the membrane assembly 400 can be achieved. The adhesive layers 428, 432, 434 may define apertures 406*b* that are a part of the overall structure of the channel 408 and/or inner portion 413 (FIG. 4C) of the channel 408 such that sound can travel between the external environment and a microphone (not shown).

The sub-membrane 430 may function to support the membrane 410 as the membrane 410 trampolines or facilitates transfer of sound between the external environment and the microphone (not shown). The sub-membrane 430 may have similar dimensions (i.e., length and/or width) so that sound is facilitated through the channel 408 (e.g., see FIG. 4C). In other examples, the sub-membrane 430 may have a thickness that is less than the thickness of the membrane 410, since the membrane 410 bears a larger load of the sound impact travelling from the external environment; for example, the sub-membrane 430 may have a thickness of about 0.01 mm to about 0.1 mm.

FIG. 5 is a cross-sectional view of a portion of an image capture device 500, such as the image capture devices 100, 200 of FIGS. 1A-2B, showing a membrane assembly 502 within a housing 504. Passages 506, 508 are shown extending from the external environment to an inside of the housing 504. Although not shown, the passages 506, 508 are parallel with and spaced from other passages (not shown) present on the housing 504, so that if the image capture device 500 was viewed from a side, nine of the passages 506, 508 would be shown. At the inside of the housing 504, the membrane assembly 502 separates a microphone 510 from the external environment. Between the microphone 510 and the membrane assembly 502, an internal component 512 is positioned, and the membrane assembly 502 is compressed in between the internal component 512 and an inside surface of the housing 504, which may further be adhered to the either or both of the internal component 512 and the inside surface of the housing 504. With this positioning, the membrane assembly 502 prevents water or moisture from entering the housing 504 and contacting the microphone 510 or other water sensitive components (e.g., a battery, sensors, or other electrical components) because the compressive forces keep the membrane assembly 502 and the inside surface of the housing 504 in water tight contact.

Only the passage 508 is active, meaning that sound can only travel to the microphone 510 through the passage 508. The passages 506 extend between the membrane assembly 502 and the external environment and lack a pathway all the way to the microphone 510. For example, the passages 506 may be blocked from having sound communication with the microphone 510 by indents or blocking layers (not shown, see apertures 406*a* of FIGS. 4A and 4C) formed in or by various sub-layers of the membrane assembly 502.

At a location of the indents (not shown, see locations of the apertures 406*a* of FIGS. 4A, 4C, and 4D), the membrane assembly 502 has a depth $D_1$ which describes a depth of the indents that are in fluid communication with the passages 506. The depth $D_1$ may be a depth described in relation to any component of the outer portion and/or front layer (e.g., the outer portion 412 and the front layer 402 of FIG. 4C) so that a sufficient depth is achieved relative to an entire depth $D_2$ of the membrane assembly 502 to give the appearance of an aperture (e.g., the aperture 406*b* of FIGS. 4A and 4C) that is active.

The membrane assembly 502 may have the depth $D_2$ that is larger than the depth $D^1$. For example, the membrane assembly 502 encompasses more layers (e.g., the adhesive layers 416, 420, 424, 428, 432, 434, the structural layers 418, 422, the compressible layer 426, the membrane 410, and the sub-membrane 430 of FIG. 4D) having the depth $D_2$ than the membrane assembly 502 has layers (e.g., the adhesive layers 420, 424 and the structural layers 418, 422) associated with the indents having the depth $D_1$. The passages 506, 508 may have a depth $D_3$ that is larger than both the depths $D_1$ and $D_2$, and the combination of $D_1$ and $D_3$ may be sufficiently long so that the passages 508 that are inactive appear to be passages 506 that are active.

When an image capture device uses multiple microphones, such as the image capture device 200 and the audio components 218, 220, 222 of FIGS. 2A-2B, the reception of sound can be coordinated among the microphones to achieve optimal sound in a video captured by the image capture device. For example, using the membrane assembly 400 and/or the membrane assembly 502 at multiple microphone positions allows for better control of the reception of sound by having multiple locations to receive sound. In addition, the size of the membranes (e.g., the membrane 410 and the sub-membrane 430 of FIG. 4D) may be configured to reduce undesirable vibrations in the membranes that affect the reception of sound. With a combination of multiple microphones using a membrane assembly such as the membrane assembly 400 or the membrane assembly 500 with optimally sized and located membranes, sound is received through multiple locations, and as a result, the user sees more active apertures or holes that receive sound than are actually traversed through the body of the image capture device to each microphone.

In this disclosure, the term microphone may be used interchangeably with microphone port and/or audio component. Aperture may be used interchangeably with hole, through hole, and/or channel. Camera and image capture device may be used interchangeably. Housing and body may be used interchangeably. An inner portion may be referred to as an interior or internal portion. An outer portion may be referred to as an external or exterior portion.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An image capture device, comprising:
a housing having a pattern of apertures; and
a membrane assembly, comprising:
a support that has internal and external surfaces;
a channel that aligns with at least one aperture of the pattern of apertures and extends between the internal and external surfaces; and
indents that are adjacent to the channel, aligned with the pattern of apertures, and
disposed on the external surface, wherein the indents have a depth that is less than a depth of the channel.

2. The image capture device of claim 1, wherein the membrane assembly further comprises:
a membrane that intersects the channel within the support so that water is prevented from entering the image capture device through the channel.

3. The image capture device of claim 2, wherein a cavity is formed between the membrane and the housing within the channel, and wherein the cavity has a width greater than a width of the at least one aperture aligned with the channel.

4. The image capture device of claim 3, wherein the support of the membrane assembly is compressible so that compressive forces from the external surface of the support against the housing form a watertight seal between the external surface and the housing.

5. The image capture device of claim 1, wherein the channel has a width that is greater than a width of the at least one aperture that is aligned with the channel.

6. The image capture device of claim 5, wherein the channel has a uniform width from the internal surface to the external surface of the support.

7. The image capture device of claim 1, further comprising:
a microphone positioned at the internal surface of the support and aligned with the channel.

8. The image capture device of claim 1, wherein the pattern of apertures includes at least four apertures symmetrically arranged around the at least one aperture aligned with the channel.

9. The image capture device of claim 8, wherein the pattern of apertures includes at least six apertures symmetrically arranged around the at least one aperture aligned with the channel.

10. An image capture device, comprising:
a membrane assembly, comprising:
a support that has internal and external surfaces;
a channel that extends between the internal and external surfaces;
a membrane intersecting the channel within the support; and
a pattern of indents disposed on the external surface and adjacent to the channel,
and
a housing that encloses the membrane assembly and comprises a pattern of apertures that aligns with and exposes the channel and the pattern of indents to an external environment.

11. The membrane assembly of claim 10, wherein the support comprises:
an inner layer that is in contact with an internal surface of the membrane; and
an outer layer that is in contact with an external surface of the membrane, wherein the pattern of indents are included with the outer layer.

12. The membrane assembly of claim 11, wherein the outer layer comprises:
a base layer in contact with the external surface of the membrane; and
an indent layer positioned on the external surface of the support.

13. The membrane assembly of claim 12, wherein the inner layer is compressible.

14. The membrane assembly of claim 12, wherein the pattern of indents has a depth that is less than a depth of the channel between the internal and external surfaces.

15. An image capture device, comprising:
a housing comprising indents defined around an aperture;
a support integrated with an interior of the housing, wherein the indents extend through the housing and partially through the support;
a microphone that is enclosed within the housing adjacent to the support;
a channel that extends from the aperture through the support and to the microphone; and
a membrane that intersects the channel.

16. The image capture device of claim 15, wherein a cavity is formed between the membrane and the housing within the channel.

17. The image capture device of claim 16, wherein the channel comprises:
a first portion positioned between the microphone and the membrane; and
a second portion positioned between the housing and the membrane,
wherein the second portion includes the cavity and has a width that is greater than a width of the first portion and/or each of the indents.

18. The image capture device of claim 15, wherein the indents are radially parallel relative to the channel.

19. The image capture device of claim 15, wherein the support is adhered against the housing to form a watertight seal.

20. The image capture device of claim 15, wherein a diameter of the channel is greater than a diameter of the aperture.

* * * * *